Dec. 1, 1959      E. W. TODD      2,915,130
IMPLEMENT GAUGING MEANS
Filed Oct. 17, 1956      3 Sheets-Sheet 1
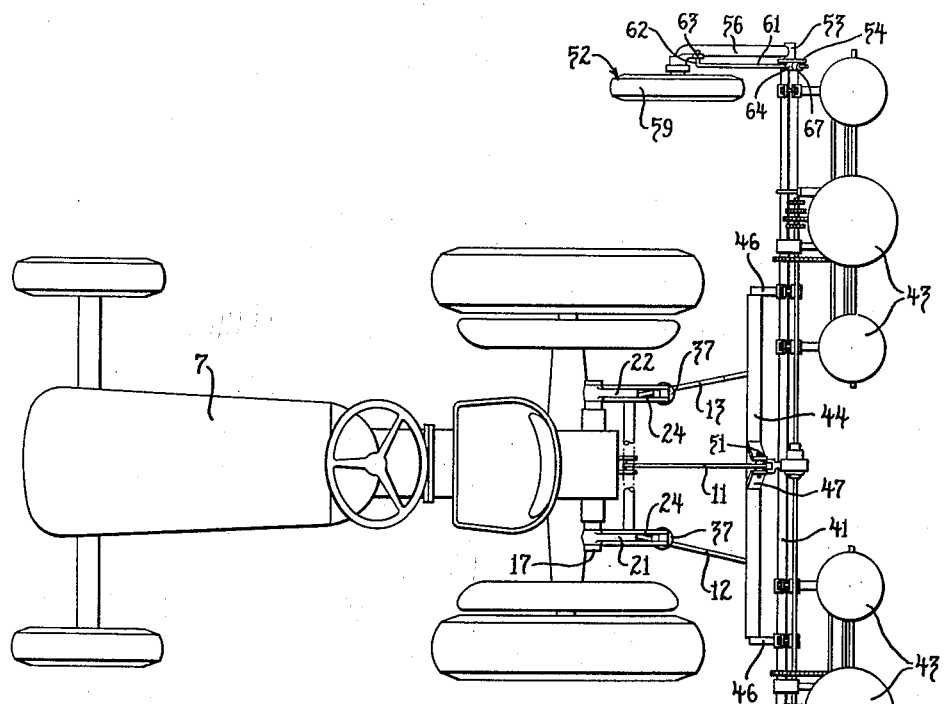
Fig. 1
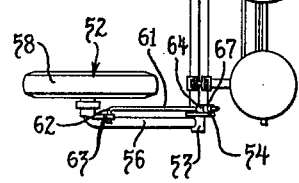
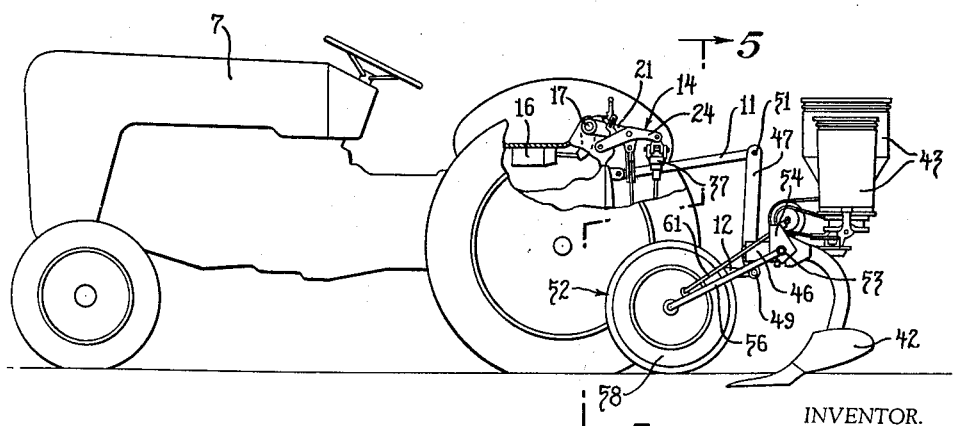
Fig. 2
INVENTOR.
EVERETT W. TODD
BY James E. Nilles
Irvin L. Groh
ATTORNEYS.

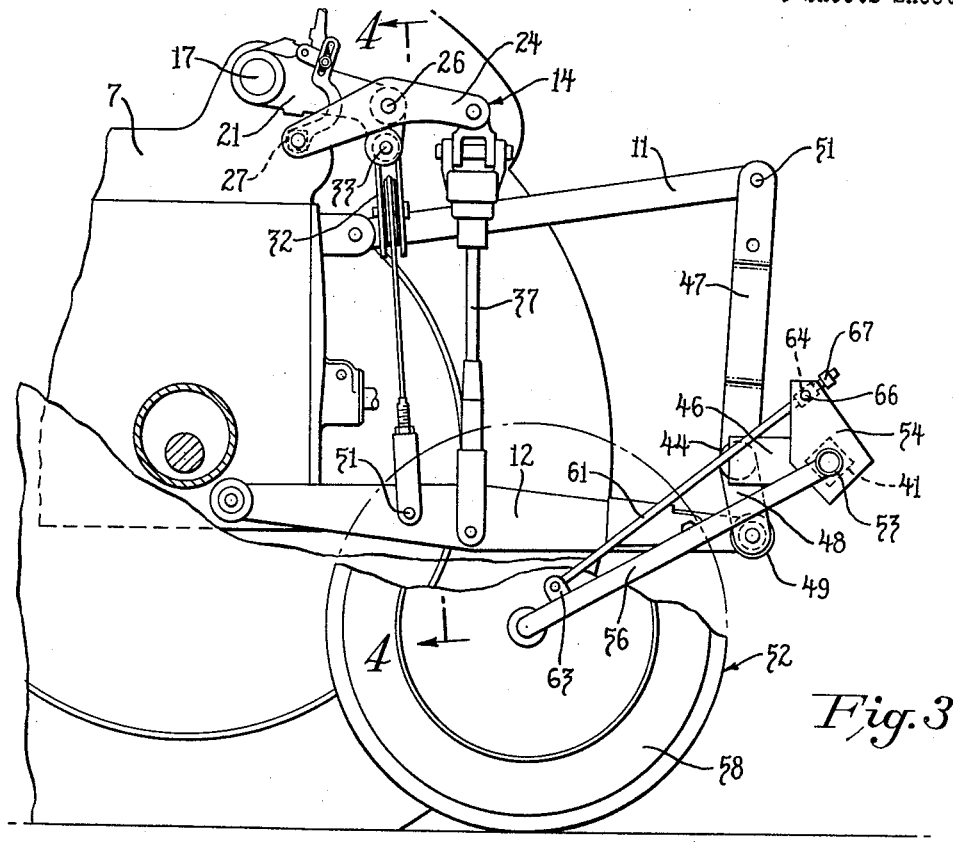
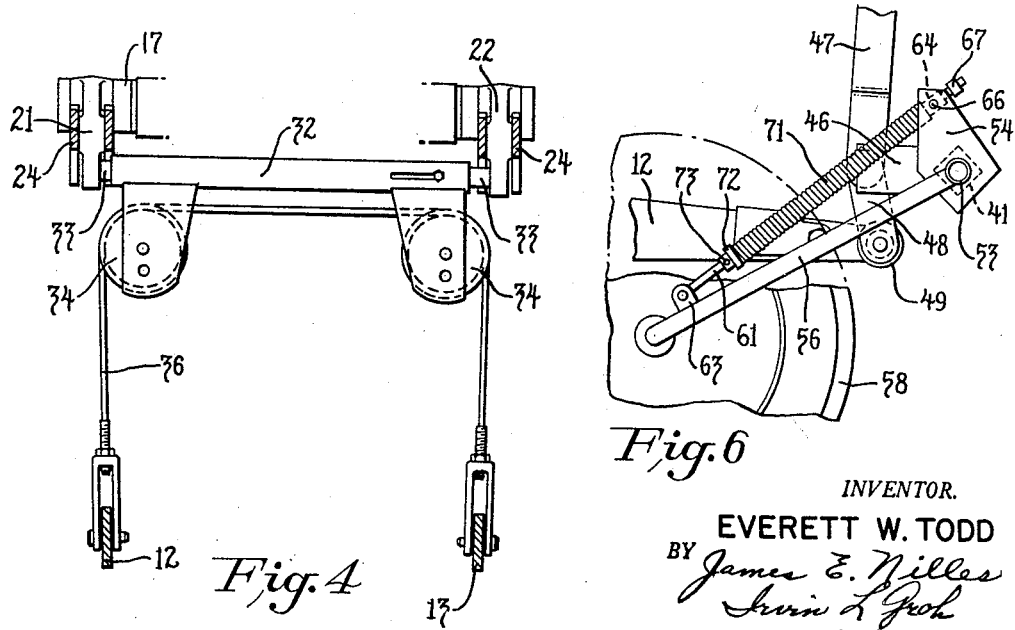

INVENTOR.
EVERETT W. TODD

United States Patent Office 2,915,130
Patented Dec. 1, 1959

2,915,130

IMPLEMENT GAUGING MEANS

Everett W. Todd, Dearborn, Mich., assignor to Massey-Ferguson Inc., a corporation of Maryland Application October 17, 1956, Serial No. 616,457

10 Claims. (Cl. 172—239)

This invention relates to agricultural implements and particularly to soil working implements of the type adapted to be supported on a tractor.

Certain tractor mounted implements such as field cultivators and listers, for example, have a width greater than the width of the tractor which supports them. Proper operation of such wide implements requires that they be permitted to follow the ground contour and remain parallel to the ground independently of the position of the tractor. To accomplish this it is common practice to provide gauge wheels at the lateral extremities of the implement so that the implement is supported at a fixed heighth above and in parallel relation to the ground. With such arrangements, the major portion of the implement weight is supported on gauge wheels and, consequently, the benefit of increased traction due to the addition of implement weight to the weight of the tractor is lost. Furthermore, to change the depth of operation of the ground working tools, it is necessary to provide some means of adjustment by which the gauge wheels may be adjusted vertically relative to the implement or by which the tools may be adjusted relative to their supporting frame.

It is a general object of this invention to provide an implement in which all or a substantial portion of the implement weight may be supported directly from the tractor and yet the implement may be maintained parallel to the ground independently of the position of the tractor.

It is a further object of this invention to provide an implement which may be maintained parallel to the ground and which may be adjusted vertically relative to the tractor which supports it without destroying the parallel relation to the ground.

It is still another object of the invention to provide an implement which may be maintained parallel to the ground for all ground working depths of the tools and in which change in depth of the tools may be accomplished by moving the implement vertically relative to the tractor while the implement is in a parallel position to the ground without necessitating readjustment or repositioning of either the ground working tools or the gauge elements.

It is a still further object of the invention to provide an implement utilizing a gauging arrangement which is effective to maintain opposite sides of the implement at the same height above the ground for all ground working positions without supporting the weight of the implement.

More specifically it is an object of the invention to provide an implement of the above outlined character which includes a pair of gauging elements movable as a unit independently of the remainer of the implement to coact with the soil to maintain the implement parallel to the ground without supporting the weight of the implement.

The foregoing and other objects and advantages are attained by the present invention, various novel features of which will be apparent from the following description and from the accompanying drawings disclosing a preferred embodiment of the invention.

Referring to the drawings:

Fig. 1 is a top view of a tractor and an implement embodying the invention.

Fig. 2 is a side elevation of the tractor implement arrangement illustrated in Fig. 1 with parts of the tractor broken away and with certain parts of the power actuated lift system indicated somewhat diagrammatically.

Fig. 3 is a side view of a rear portion of the tractor and implement in Fig. 2 shown at an enlarged scale and with parts of the tractor and implement broken away and removed for purposes of disclosure.

Fig. 4 is a fragmentary sectional view of a portion of the lift mechanism taken generally from line 4—4, Fig. 3.

Fig. 6 is a fragmentary side view showing a modified form of a portion of the mechanism shown in Fig. 3.

Figure 5:
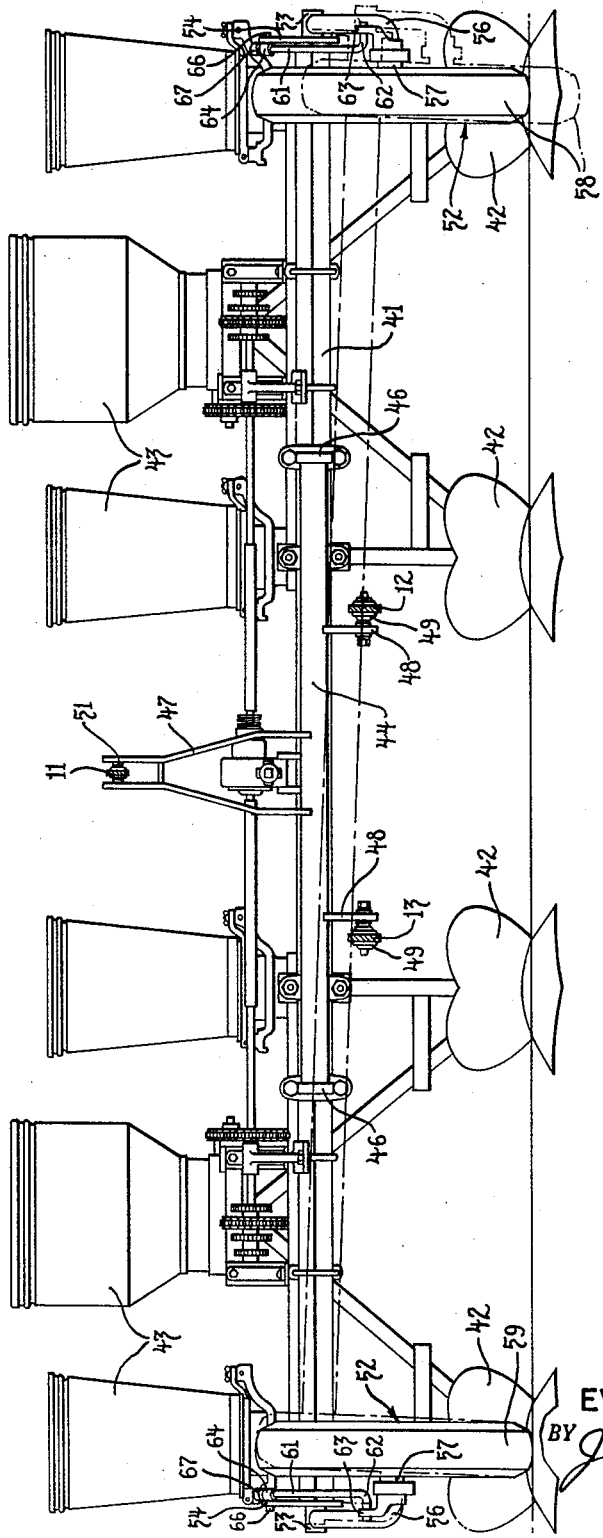
Fig. 5 is an enlarged view of the implement looking rearwardly from the tractor and taken generally on the line 5—5 in Fig. 2.

Referring to the drawings, a preferred embodiment of the invention is disclosed in connection with an implement mounted on the rear portion of a tractor 7 equipped with a three-point linkage and an implement control system which has become well known in the art and is more fully disclosed in the patent to Ferguson 2,118,180. The linkage includes an upper compression link 11 and a pair of laterally spaced draft links 12 and 13. The draft links are pivoted in trailing relation on the tractor body and are suspended from a power operated lift structure 14 to be moved vertically relative to the tractor. The power means for actuating the lift structure is preferably of the hydraulic ram type supported along with its associated control instrumentalities within the tractor body. The construction and mode of operation of the linkage 11, 12 and 13, lift structure 14 and the power operated control system is fully disclosed in the above identified patent to Ferguson. For present purposes, it is only necessary to consider that the admission of pressure fluid to an actuating ram 16 serves to rock a lift shaft 17 to raise the lift structure 14 and the draft links 12 and 13 while relief of pressure permits the lift structure and the links to descend by gravity. In this type of system provision is normally made for both manual and automatic control of the admission to and the exhaust of pressure fluid from the ram 16. For manual control purposes, a hand lever adjacent the operator's seat is shifted to actuate a control valve (not shown) to raise and lower the draft links 12 and 13 between ground working and transport positions. For automatic control purposes, the control valve is arranged to be operated upon longitudinal movement of compression link 11. Movement of the link 11 is caused by the reaction the ground and the implement 6 so that the hitch linkage is raised or lowered in response to variations in draft load exerted by the implement.

The lift structure by which lifting force is transmitted from the power actuated system to the hitch structure includes a pair of lift arms 21 and 22 connected to the rock shaft 17 for up and down swinging movement in unison on the rear portion of the tractor. The structure associated with each lift arm is identical, but for purposes of disclosure only the mechanism associated with the left lift arm 21 will be discussed. As seen in Fig. 3, an auxiliary arm 24 has its intermediate portion pivotally connected to the free end of the lift arm 21 by means of a pin 26. The forward end of arm 24 is provided with a block 27 which engages the underside of the lift arm 21 to limit clockwise movement of arm 24 relative to lift arm 21. Upon upward swinging movement of lift arm 21, block 27 forms a one way lift connection with lift arm 21 which is effective to cause upward swinging movement of auxiliary arm 24. This connection makes it possible for the auxiliary arm 24 to swing a limited amount independently of the lift arm 21 and also independently of the other auxilary arm 24 associated with the lift arm 22 at the opposite side of the tractor.

The lift arms 21 and 22 are connected to the draft links 12 and 13 through a mechanism which, as shown in Figs. 3 and 4, includes a bracket hanger 32 having its opposite ends provided with short shafts 33 rotatably supported in openings in lift arms 21 and 22, respectively. The bracket hanger 32 rotatably supports a pair of pulleys 34 which are in rolling contact with a cable 36 having its opposite ends connected to the draft links 12 and 13, respectively. Such an arrangement makes it possible for the draft links 12 and 13 to swing vertically in opposite directions relative to each other and still be connected to lift arms 21 and 22. For example, as shown in Fig. 4, when draft link 12 moves downwardly from the illustrated position the other link 13 will raise a like amount due to the interconnecting cable 36. At the same time, the cable affords a load transmitting connection between the lift arms and the draft links so that the implement may be moved vertically in its ground working range. After the implement has been raised out of its ground working position by the mechanism including the pulleys 34 and cable 36, the one-way connections between the pair of lift arms 21 and 22 and their associated auxiliary arms 24 become effective to lift the auxiliary arms 24 which are connected to the draft links through a pair of drop links 37. Upward swinging of the auxiliary arms 24 is therefore effective to lift the implement upwardly to a transport position. During raising movement of the implement through the drop links 37, the cable 36 becomes slack and ineffective to cause lifting because the ends of the lift arms 21 and 22 swing along a shorter arc than the ends of the auxiliary lift arms 24.

The above described lift structure makes it possible for an implement connected to the draft links 12 and 13 to tilt relative to the tractor when the implement is in ground working position and yet it may be adjusted vertically in its ground working positions without changing the laterally tilted position of the implement relative to the tractor. Furthermore, after the implement has been raised from its ground working position, the drop links 37 become effective to raise the implement to a laterally balanced position on the tractor.

The implement 6 embodying the invention is a four-row bedder-planter, which as seen in Fig. 1 has a width substantially greater than the width of the tractor 7 on which it is mounted. The implement includes an elongated frame member or tool bar 41 which extends transversely to the direction of implement travel and acts as a support for various components such as soil working tools or bedders 42 and also seed and fertilizer containers 43 and their associated mechanism. Means for connecting the tool bar 41 to the hitch linkage of the tractor includes a hitch bar 44 disposed forwardly of the tool bar and rigidly connected thereto through brackets 46 and also a strut assembly 47 rigidly connected to the hitch bar 44. As seen in Figs. 3 and 5, a pair of depending brackets 48 are connected in laterally spaced relation to the hitch bar 44 and are adapted to be pivotally connected to the hitch links 12 and 13 through a pair of coupling members 49 which afford universal movement between each of the draft links and its associated bracket 48. The compression link 11 forming the third link of the three-point hitch structure is pivotally connected by a pin 51 at the upper end of the strut assembly 47. In this manner the implement is supported on the tractor through three points afforded by the links 11, 12 and 13 so that it may be moved vertically relative to the tractor between ground working and a transport position. Furthermore, since the draft links 12 and 13 are free to move vertically relative to each other, it will be noted that the implement may tilt relative to the tractor when tools 42 are in a ground working position.

As seen in Figs. 1, 2 and 3, the gauging arrangement 52 by which the implement is guided to follow the contour of the ground includes a shaft 53 disposed within the hollow tool bar 41. The shaft 53 is slightly longer than the tool bar and its opposite ends protrude through openings in brackets 54. The brackets are rigidly connected to the opposite ends of the tool bar 41 as by welding or the like, and the openings in the brackets afford bearings by which the shaft 53 is supported for rotation within the hollow implement tool bar 41. Ground engaging gauging members including a pair of arms or support members 56 are rigidly connected in laterally aligned relation to each other at opposite ends of the shaft 53 and in the normal ground working position of the implement, extend radially from the shaft 53 and forwardly and downwardly from the tool bar 41. The free ends of the arms 56 are provided with a pair of transverse axles 57 which are in axial alignment with each other to rotatably support a pair of ground engaging elements in the form of gauge wheels 58, 59, respectively. The gauge wheels rotate independently of each other and swing vertically as a unit relative to the implement tool bar 41. As seen in Figs. 1 and 2, the wheels are disposed slightly forward of the tool bar 41 and, consequently, forward of the tools 42.

Upward swinging movement of the wheels 58, 59 relative to the implement tool bar 41 is unrestricted but downward swinging movement is limited by stop means associated with each arm 56 so that the wheels may be supported relative to the implement when the latter is in a transport position. As seen in Fig. 3 and Fig. 5, the stop means associated with the wheel 58 include a rod 61 having its forward end portion bent outwardly to provide a pivot 62 which is journaled in a bracket 63 rigidly mounted on the forward end of the arm 56. A portion of the rod 61 adjacent its other end is slidably supported in a trunnion block 64 pivotally connected as at 66 to the bracket 54 rigidly mounted on the end of the tool bar 41. The end of the rod adjacent the trunnion block 64 is provided with an adjustable stop element 67 which may be mounted on the rod 61 through a threaded connection, or set screw or the like, so that it may be adjusted longitudinally of the rod to determine the position at which it will engage the trunnion block 64 for limiting downward swinging movement of the wheel 58 and arm 56. It is to be understood that similar stop means are associated with the arm 56 and wheel 59 at the opposite side of the implement. The stop means makes it possible for the gauge wheel assembly to swing vertically relative to the implement 6 when the tools of the latter are in a ground working position. On the other hand, the downward position to which the gauge wheels 58 and 59 swing may be determined by the engagement of stop elements 67 with their corresponding trunnion blocks 64. During normal operation of the implement in its ground working positions, the wheels will not swing downwardly a sufficient distance to cause engagement of the stop element 67 with the trunnion block 64. Such engagement normally occurs only when the implement is moved to a transport position on the tractor, at which time the wheels are held vertically fixed relative to the implement for transport purposes.

The gauging structure is provided with means for urging the wheels downwardly. This can be accomplished by using wheels of substantial weight or by adding wheel weights to conventional type wheels. With an implement of the type shown in Figs. 1 through 5 it has been found satisfactory to use wheels having a weight of approximately 150 lbs. each. This weight is supported by the ground independently of the implement during normal ground working operation of the implement and the entire weight of the implement is supported from the tractor.

In certain field operations and with certain types of implements, it may be permissible to use wheels of normal weight and to urge the wheels downwardly relative to the frame through means such as that illustrated in the modification shown in Fig. 6. In this modification, a compression spring 71 is supported on each of the rods 61 to react between the associated trunnion 64 and a stop collar 72 adjustably mounted on each rod 61 by means of a set screw 73 or the like. The springs 71 are consequently reacting between the implement bar 41 and the wheels 58 and 59, respectively, to urge the latter downwardly.

During operation of the implement 6 illustrated in Figs. 1–5 with the ground engaging bottoms 42 in the ground, the weight of the implement is supported on the tractor through the hitch linkages 11, 12 and 13, which also permit tilting of the implement relative to the tractor. The wheels 58 and 59 of the gauging structure 52 are maintained in rolling contact with the ground due to their weight but do not support the weight of the implement. This is best understood by referring to Fig. 3. If the lift mechanism is actuated to lift the draft links 12 and 13 a small distance, the implement bar 41 will also be raised. However, the shaft 53 is free to rotate relative to the tool bar and the wheels will remain in contact with the soil without supporting the implement weight. On the other hand, if the implement is lowered a small distance, the wheels will remain in contact with the ground and swing upwardly relative to the implement. This makes it possible to vary a depth at which the ground engaging tools 42 operate by merely actuating the power operated lift arrangement associated with the tractor, and it is unnecessary to mechanically re-adjust the position of the gauge wheels 58 and 59 or to re-position the tools relative to the tool bar 41. When the implement 6 is operated in ground of varying contour, the wheels 58 and 59 will remain in simultaneous contact with the ground and permit the implement to tilt relative to the tractor if it should become necessary. Since the wheels are supported for swinging movement as a unit relative to the implement and since they are maintained in contact with the ground, the shaft 53 will be maintained in a generally parallel position relative to the ground, that is, a position in which opposite ends of the shaft are at the same height above the ground. Since the shaft 53 is rotatable within the tool bar 41, any change in the position of the shaft will cause a like change in the position of the implement. In other words, if the shaft is parallel to the ground but in a tilted position relative to the tractor, the implement will also assume the same tilted position.

These conditions will be more readily understood by referring to Fig. 5, and considering the operation of the implement when the left wheel 59 encounters a raised surface such as a clod of soil or the like. In actual operation the implement bar 41 is free to tilt relative to the tractor but, for purposes of explanation, it is more convenient to assume that the implement bar is momentarily held laterally rigid relative to the tractor. Under such conditions the left wheel 59 will roll onto the raised surface and cause its associated arm 56 to swing upwardly relative to the implement bar 41. Such swinging will also swing the right wheel 58 upwardly out of engagement with the ground so that the weight of the wheel exerts a tilting torque on the bar 41. At this point, if the implement bar 41 is no longer held rigidly relative to the tractor, the wheel 58 will fall to the ground due to its weight and will carry with it the right end of the shaft 53 and the right of the tool bar 41 so that the tool bar tilts and assumes an accommodating position similar to that shown in broken lines in Fig. 5. In like manner if the right wheel 58 encounters a depression in the ground and if the bar 41 is held momentarily rigid relative to the tractor, the left wheel 59 will remain in contact with the ground and support the right wheel 58 in an elevated position above the depression. If the bar is then released so that it may tilt relative to the tractor, the wheel 58 will drop into the depression and pull the right end of the shaft 52 and tool bar 41 downwardly so that they assume a tilted position indicated by broken lines in Fig. 5. In actual operation of the implement in its ground working positions, there is no time interval during which either of the wheels 58 or 59 would be suspended above the ground. Since the tool bar is supported so that it is free to tilt relative to the tractor the gauge wheels 58 and 59 will remain in continuous contact with the ground simultaneously.

The above described operation of the implement illustrated in Figs. 1 through 5 is also applicable to an implement embodying the modification illustrated in Fig. 6. In this case, however, the springs 71 at opposite sides of the implement react between the implement tool bar 41 and the wheels 58, 59 so that at least a small portion of the implement weight is supported by the wheels when the implement is in a ground working position.

It will now be apparent that there has been provided an implement which is not only free to tilt laterally to follow the contour of the ground for maintaining its associated tools at a uniform depth independently of the position of the tractor but also is so arranged that all or substantially all of its weight is supported on the tractor so that the weight of the tractor and the implement are combined to increase traction. Furthermore, the ground working depth of the tools may be readily varied merely by changing the vertical position of the entire implement on the tractor by means of the power operated lift system and such adjustment is accomplished without affecting the contour following characteristics of the implement and without requiring the usual re-adjustment and re-positioning of either the tools or the gauge elements relative to the implement tool bar. In addition, the implement may be lifted from its ground working position in which it may tilt relative to the tractor to a transport position in which it is held in a laterally balanced relation to the tractor. It will also be noted that the gauge means which makes possible the above described operations are supported for movement relative to the implement so they are effective to gauge the depth of ground working tools without supporting the weight of the implement.

It should be understood that it is not intended to limit the invention to the above described forms and details, and that the invention includes such other forms and modifications as are embraced by the scope of the appended claims.

I claim as my invention:

1. In an implement gauging arrangement adapted for use on a tractor mounted implement supported for lateral tilting and vertical swinging movement relative to the tractor, the combination comprising, an elongated shaft adapted to be mounted on said implement for rotation about an axis extending transversely to the direction of implement travel, a pair of support members rigidly connected to opposite ends of said shaft and extending radially therefrom in lateral alignment with each other, a pair of aligned axles rigidly connected to said support members, respectively, a pair of ground engaging wheels journaled on said axles, said wheels being of a substantial weight sufficient to maintain said wheels in simultaneous engagement with the ground and to maintain said shaft parallel to the ground for all ground working positions of said implement.

2. In an agricultural implement adapted to be supported on a tractor for lateral tilting movement and for vertical swinging movement between ground working and transport positions, the combination comprising, a laterally extending implement frame, a transverse shaft rotatably mounted on said frame for vertical movement therewith, a pair of arms rigidly connected to opposite ends of said shaft and extending radially therefrom in laterally aligned relation to each other, a pair of ground engaging wheels mounted on said arms for rotation about an axis extending in parallel spaced relation to said shaft, said pair of wheels being of substantial weight to urge the latter downwardly relative to said frame into simultaneous contact with the ground for maintaining said shaft and said frame parallel to the ground for all vertical positions of said wheels relative to said frame when the latter is at a ground working position.

3. In an agricultural implement adapted to be supported on a tractor for lateral tilting movement and for vertical swinging movement between ground working and transport positions, the combination comprising, a laterally extending implement frame, a transverse shaft rotatably mounted on said frame for vertical movement therewith, a pair of arms rigidly connected to opposite ends of said shaft and extending radially therefrom in laterally aligned relation to each other, a pair of ground engaging wheels mounted on said arms for rotation about an axis extending in parallel spaced relation to said shaft, said pair of wheels being of substantial weight to urge the latter downwardly relative to said frame into simultaneous contact with the ground for maintaining said shaft and said frame parallel to the ground for all vertical positions of said wheels relative to said frame when the latter is in its ground working positions, and stop means associated with said frame for limiting downward swinging movement of said ground engaging wheels relative to said frame when said implement is in a transport position.

4. In an agricultural implement adapted to be supported on a tractor for up and down swinging movement and for lateral tilting movement relative to said tractor, the combination comprising, an implement frame, a pair of supporting members mounted at opposite sides of said frame for up and down swinging movement independently of said frame, said supporting structure being rigidly connected together for swinging movement as a unit, a pair of ground engaging elements supported on said structures, respectively, and spring means interposed between said frame and said structures for urging the latter downwardly relative to said frame for maintaining said member in simultaneous engagement with the ground.

5. In an implement adapted for being tiltably supported on the vertically positionable draft structure of a tractor, a gauging mechanism for laterally tilting the implement relative to the tractor in response to the ground contour, the combination comprising, a laterally extending implement frame having means for mounting the same on said draft structure, a pair of ground engaging members laterally spaced along said frame, means mounting and interconnecting said members for unrestricted and simultaneous vertical movement relative to said frame so that the members freely drop into contact with the ground in all ground working vertical positions of said frame, and means for urging said members downwardly so that a lateral tilting force is exerted on the frame when the ground contour tends to raise or lower one of said members.

6. In an implement adapted for being tiltably supported on the vertically positionable draft structure of a tractor, a gauging mechanism for laterally tilting the instrument relative to the tractor in response to the ground contour, the combination comprising a laterally extending implement frame having means for mounting the same on said draft structure, a pair of ground engaging members laterally spaced along said frame, an elongated element rotatably mounted on said frame and having parallel, radially extending arms supporting said members for unrestricted and simultaneous vertical movement relative to said frame so that the members freely drop into contact with the ground in all ground working vertical positions of said frame, and means for urging said members downwardly so that a lateral tilting force is exerted on the frame when the ground contour tends to raise or lower one of said members.

7. In an implement adapted for being tiltably supported on the vertically positionable draft structure of a tractor, a gauging mechanism for laterally tilting the implement relative to the tractor in response to the ground contour, the combination comprising, a laterally extending hollow implement frame having means for mounting the same on said draft structure, a pair of wheels laterally spaced along said frame, an elongated element rotatably mounted within said hollow frame and having parallel, radially extending arms at each end, one of said wheels being journaled at the outer end of each of said arms for unrestricted and simultaneous vertical movement relative to said frame so that the wheels freely drop into contact with the ground in all ground working vertical positions of said frame, and means for urging said wheels downwardly so that a lateral tilting force is exerted on the frame when the ground contour tends to raise or lower one of said wheels.

8. An implement gauging arrangement for mounting an agricultural implement on a tractor comprising, in combination, a laterally extending implement frame, means including a pair of independently pivoted draft links trailing rearwardly of said tractor for supporting said frame for lateral tilting, and up and down vertical positioning movement, relative to said tractor, a pair of ground engaging members laterally spaced along said frame, means mounting and interconnecting said members for unrestricted and simultaneous vertical movement relative to said frame so that the members freely drop into contact with the ground in all ground working vertical positions of said frame, and means for urging said members downwardly so that a lateral tilting force is exerted on the frame when the ground contour tends to raise or lower one of said members.

9. An implement gauging arrangement for use with a tractor having a pair of laterally spaced independently pivoted draft links and having power lift means for raising an implement connected to said draft links comprising, in combination, a transversely extending implement frame having means for coupling the central portion of the frame to the trailing ends of the draft links, means for coupling the frame to said power lift means at its central portion, said coupling means being so arranged that the weight of the implement is supported thereby while permitting lateral tilting of the implement frame from a horizontal position in both directions, ground engaging gauge members located at the respective end portions of the frame and mounted for free vertical movement with respect thereto, means for coupling together said ground engaging gauge members so that they are constrained for movement in unison with one another relative to said frame, said ground engaging members each having substantial weight so that when one of the ground engaging members tends to leave the ground because of changes in ground contour the torque exerted by the weight thereof upon the frame causes accommodating tilting movement of the frame about its support on the tractor.

10. An implement gauging arrangement for use with a tractor having a pair of laterally spaced independently pivoted draft links and having power lift means for raising an implement connected to said draft links comprising, in combination, a transversely extending implement frame having means for coupling the central portion of the frame to the trailing end of the draft links, means for coupling the frame to said power lift means at its central portion so that the weight of the implement is supported thereby, ground engaging gauge members located at the respective end portions of the frame and mounted for free vertical movement with respect thereto, means for coupling together said ground engaging gauge members so that they are constrained for movement in unison with one another relative to said frame, said ground engaging members each having substantial weight so that when one of the members tend to leave the ground because of changes in ground contour, a torque is exerted on the frame, the coupling means between the frame and the tractor being so arranged as to allow tilting of the frame to an accommodating position under the influence of said torque in which both of the gauge members are in contact with the ground.

References Cited in the file of this patent

UNITED STATES PATENTS

| | | |
|---|---|---|
| 1,401,029 | Armantrout | Dec. 20, 1921 |
| 1,698,724 | Johnston et al. | Jan. 15, 1929 |
| 2,045,209 | Thomas | June 23, 1936 |
| 2,538,093 | Goode | Jan. 16, 1951 |